Feb. 21, 1961 A. S. SWANSON ET AL 2,972,159
POWER SWEEPER
Filed June 18, 1956 6 Sheets-Sheet 5
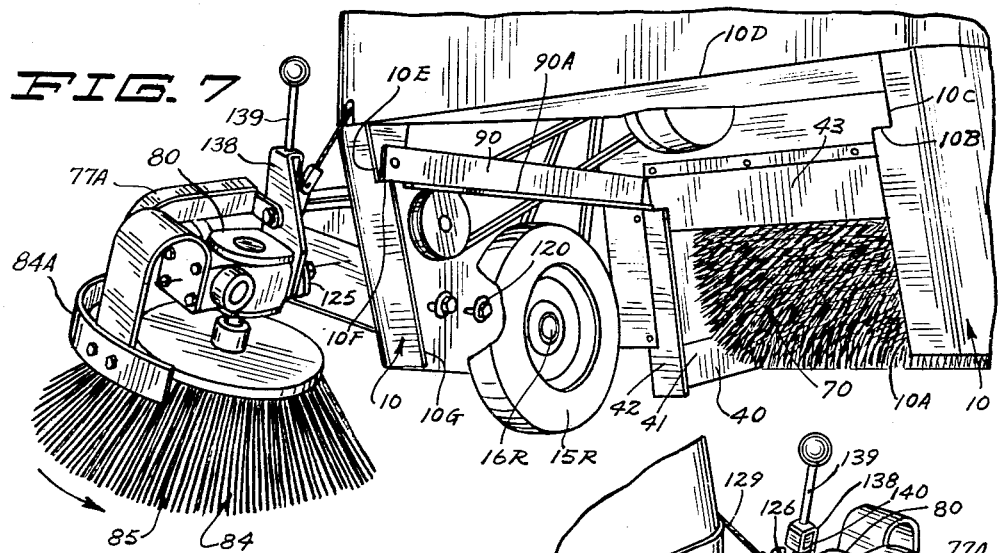
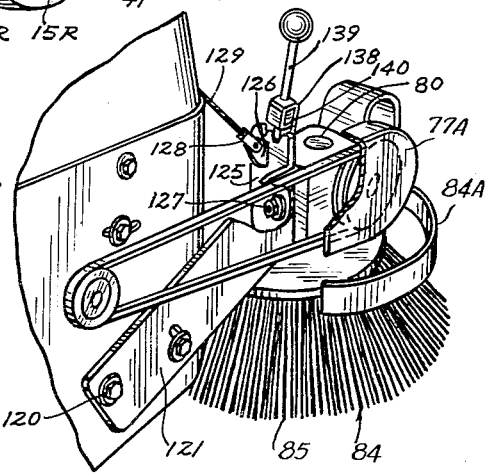
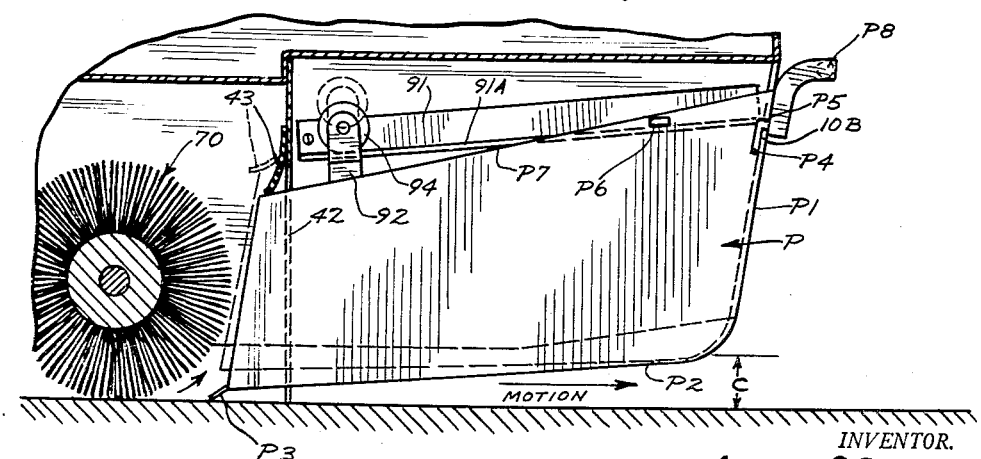
INVENTOR.
ALBERT S. SWANSON
BY HARLIE J. KIMMERLE
ATTORNEYS

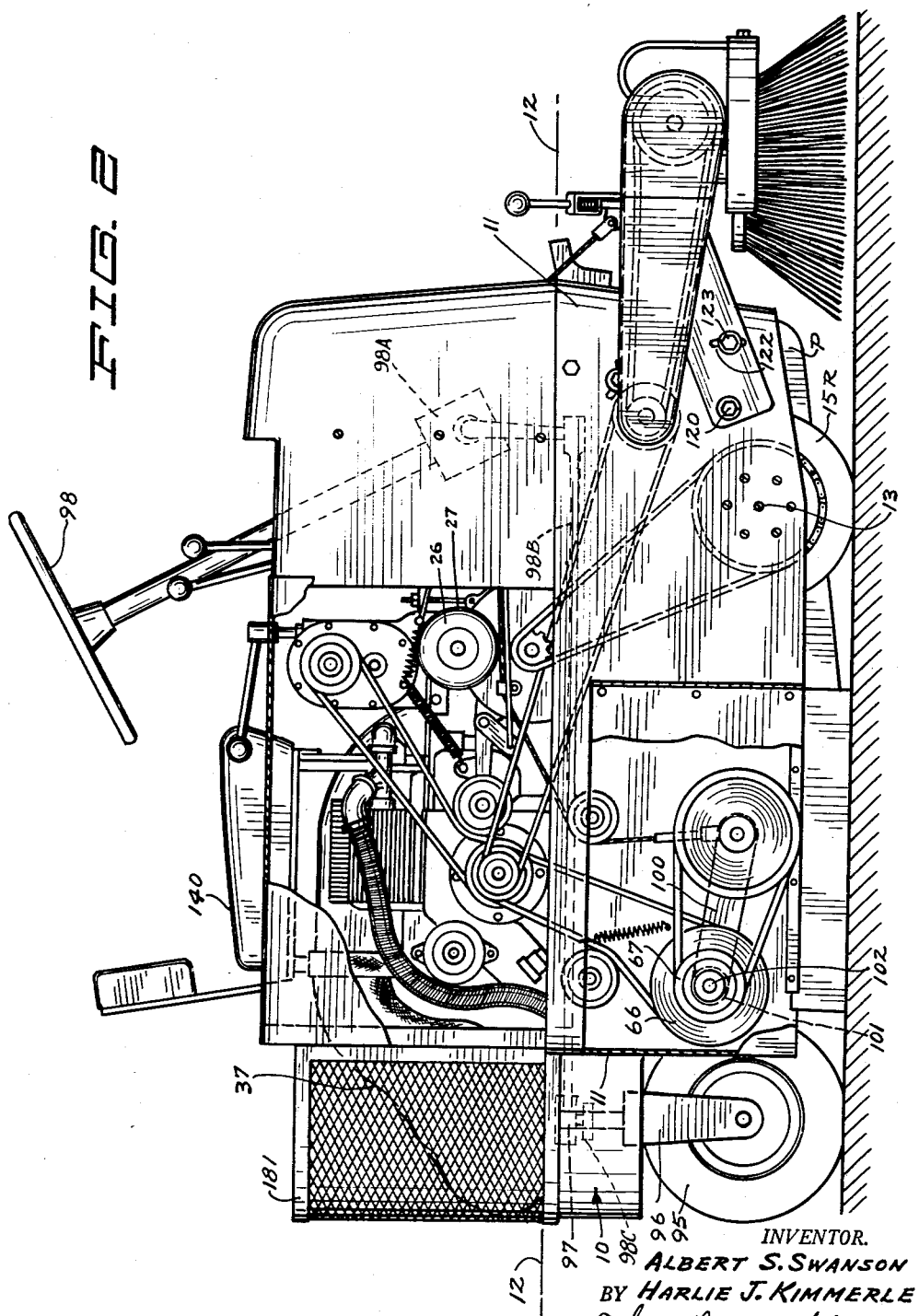

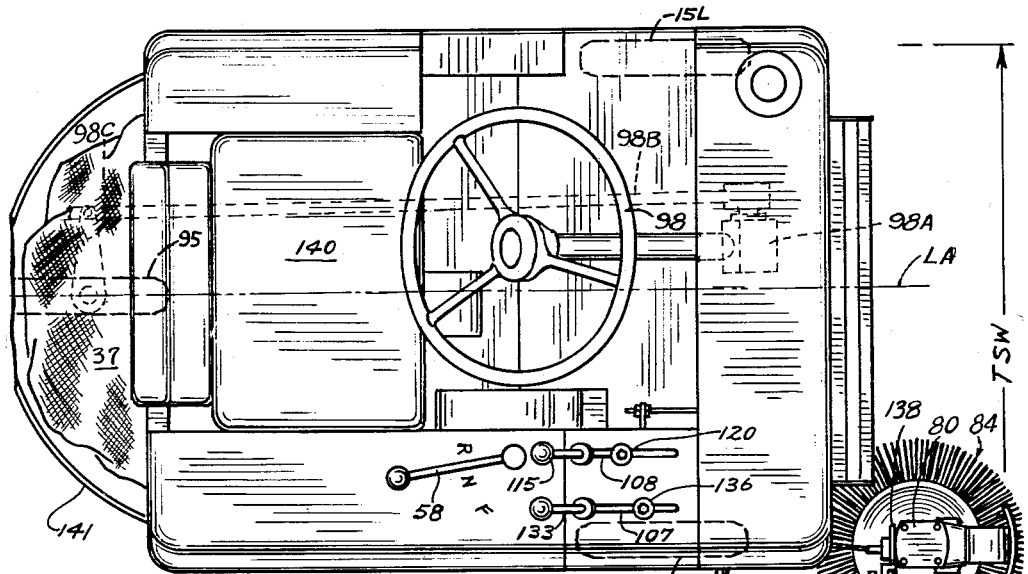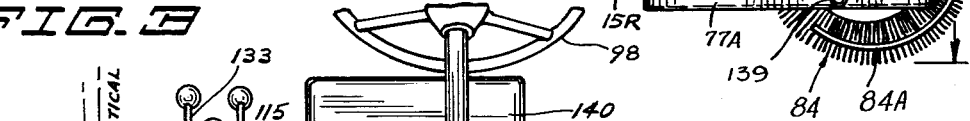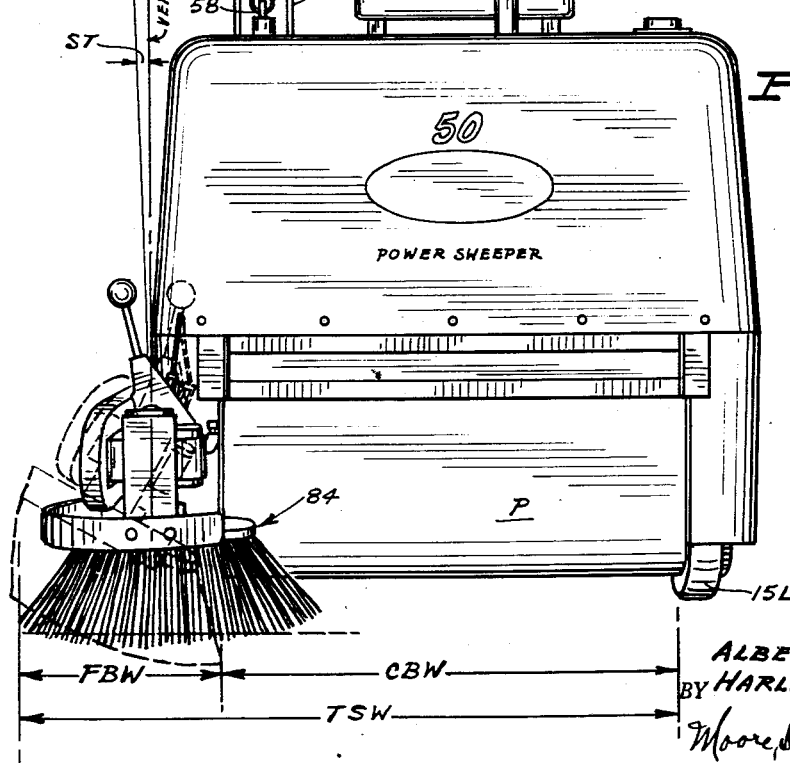

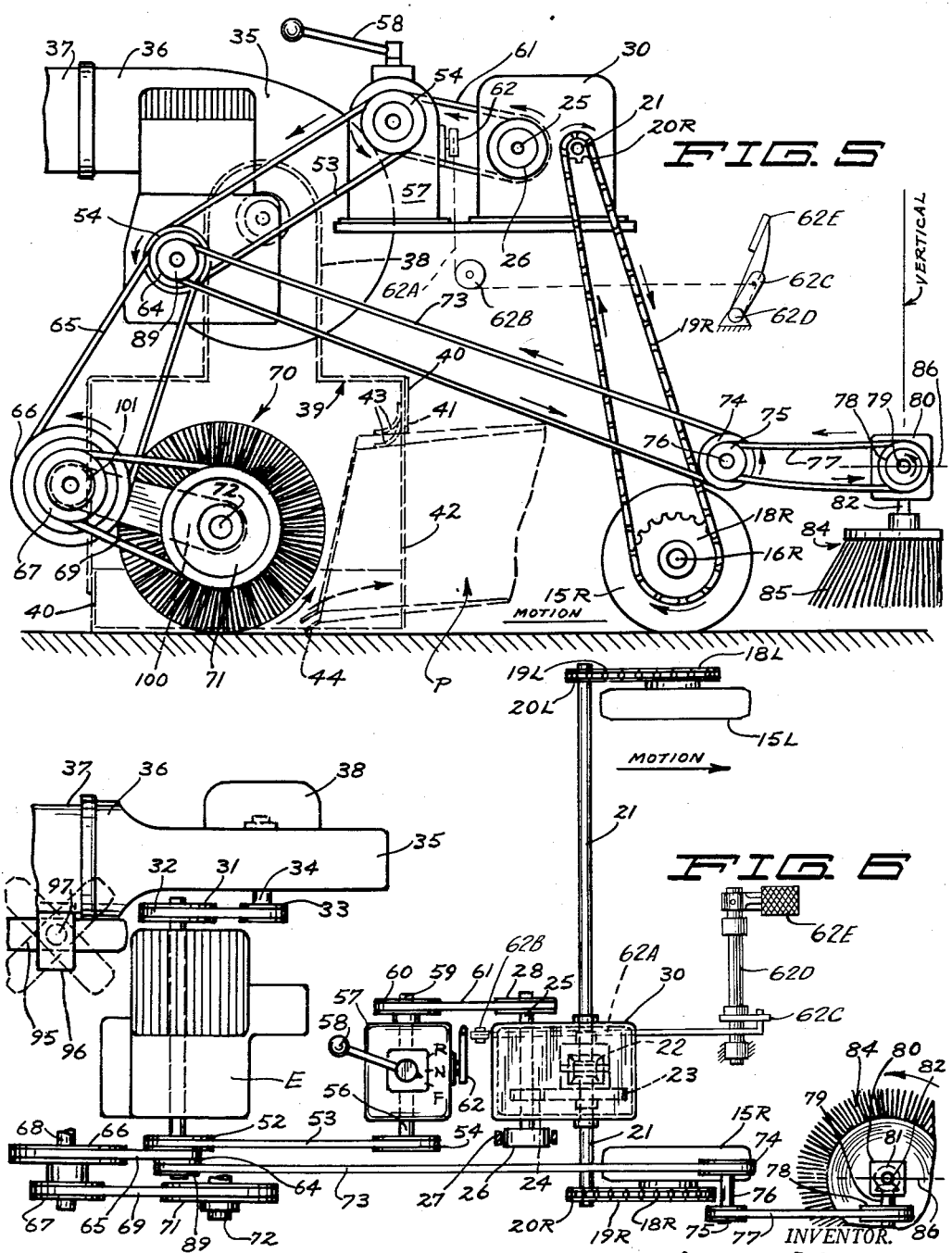

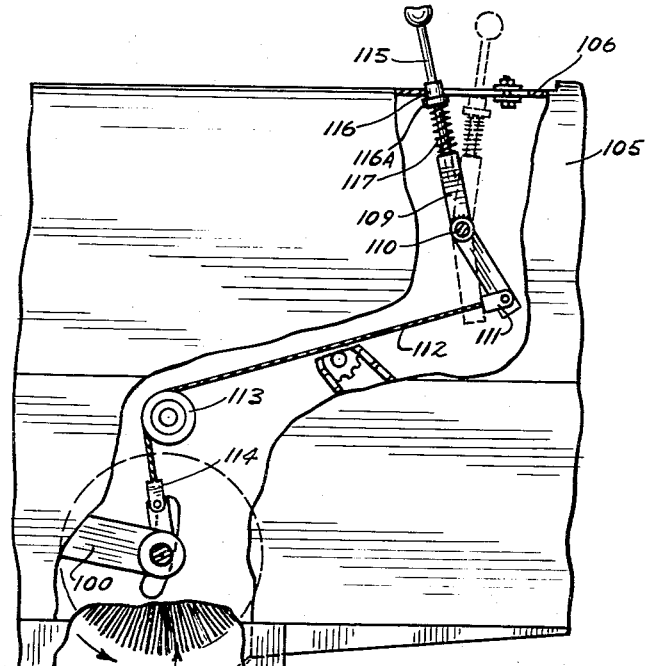
FIG. 10
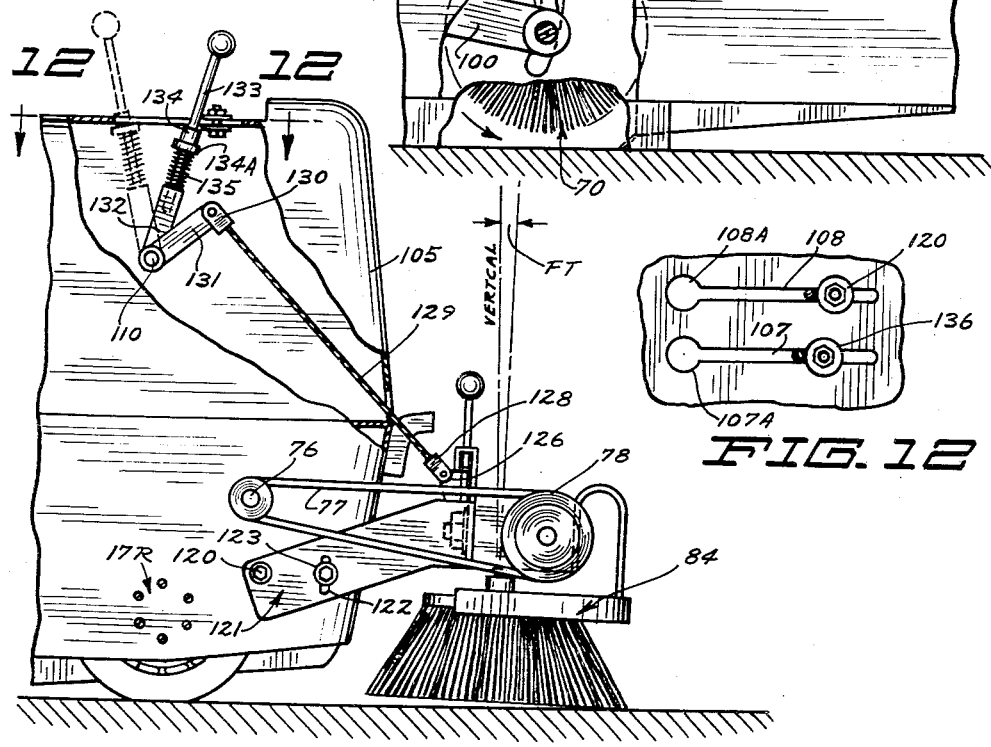
FIG. 11
FIG. 12
INVENTOR.
ALBERT S. SWANSON
BY HARLIE K. KIMMERLE
Moore, Dugger, White & Burd
ATTORNEYS United States Patent Office 2,972,159
Patented Feb. 21, 1961

2,972,159

POWER SWEEPER

Albert S. Swanson and Harlie J. Kimmerle, Minneapolis, Minn., assignors to G. H. Tennant Company, Minneapolis, Minn., a corporation of Minnesota Filed June 18, 1956, Ser. No. 591,908

3 Claims. (Cl. 15—340)

This invention relates to power driven sweeping machines and more particularly to machines which have exceptional traction and maneuverability for sweeping large indoor and outdoor areas such as factories, docks, plazas, ramps, walks, platforms, roadways, runways, sales spaces, and the like. For the sweeping of such spaces it was for many decades the practice to use the time-honored push broom and refuse cart. Then as reliable power sources became available mechanical sweeping devices of varying types have been provided, many of which, while having rendered good service, are yet capable of improvement.

It is an object of the present invention to provide an improved power sweeper.

It is another object of this invention to provide an improved agile power sweeper capable of being operated on short turns and up and down grades of considerable steepness while still adequately performing the sweeping function.

It is another object of the invention to provide a power sweeper with a low mounted refuse collecting pan which can be removed easily for servicing.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings in which

Figure 2 is a side elevational view from the right side, certain portions of the machine being broken away and sectioned;

Figure 3 is a plan view of the machine;

Figure 4 is a front elevational view;

Figure 5 is a schematic side elevational view of the power system for revolving the brushes and propelling the machine;

Figure 6 is a schematic top elevational view of the power system of Figure 5;

Figure 7 is a fragmentary front perspective view from a low elevation with the refuse pan removed from the machine and the front brush adjusted to an out-of-the-way position, this view being in a direction looking into the recess in front of the machine, in which the refuse pan is mounted;

Figure 8 is a fragmentary perspective view taken from a position alongside the right side of the machine, illustrating the front brush in normal position;

Figure 9 is a fragmentary vertical mid-sectional view thru the dirt and refuse pan on the front of the machine;

Figure 1:
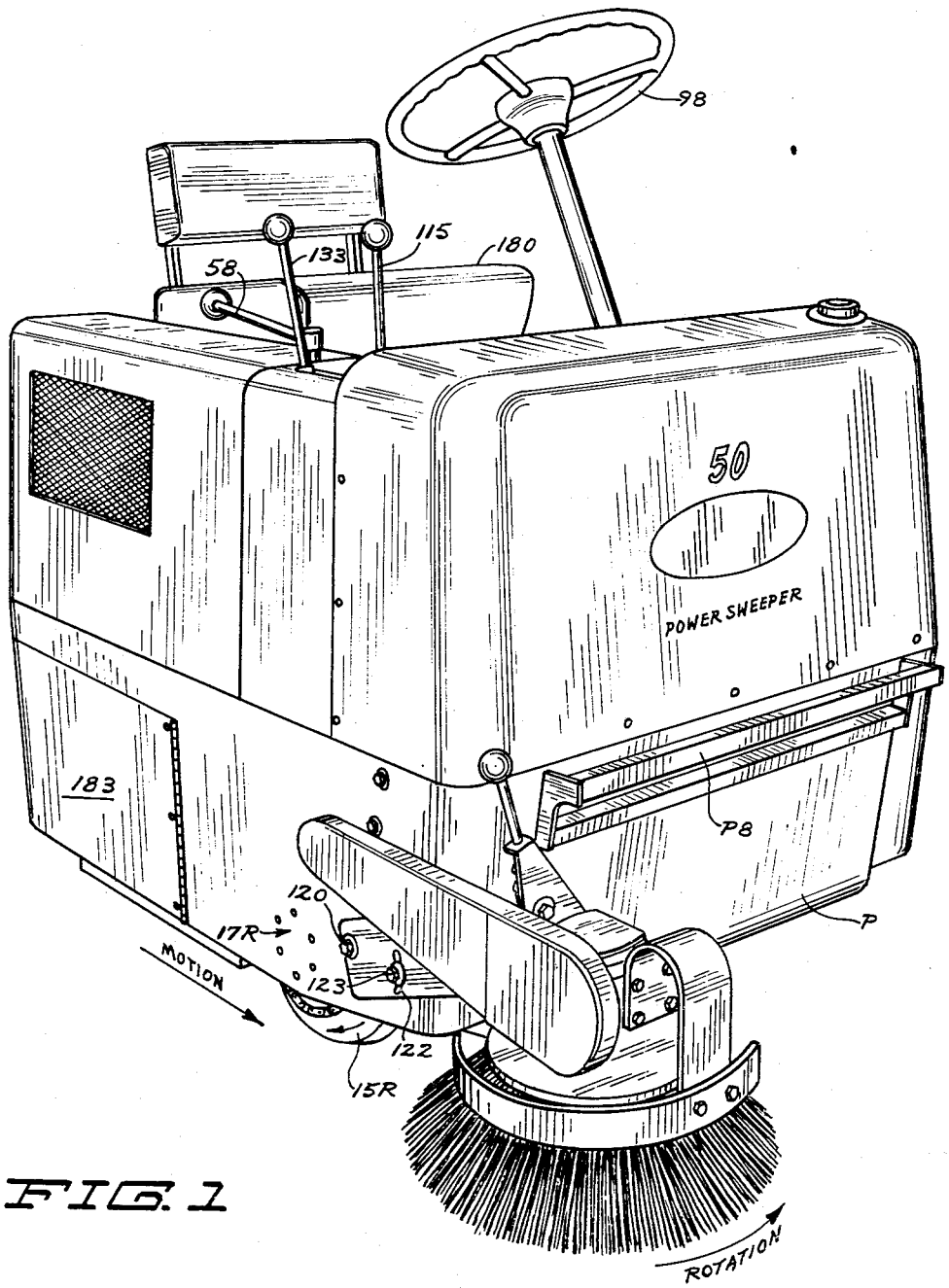
Figure 1 is a perspective view from the front of the machine.

Figures 10, 11 and 12 show the mode of adjusting brush elevations; Figures 10 and 11 being respectively fragmentary right side elevational views partially broken away showing the main adjustment; and Figure 12 a fragmentary plan view of the adjustment handle of Figure 11, Figure 12 being taken along the line and in the direction of arrows 12—12 of Figure 11.

The machine frame 10 is of steel plate formed and welded and has a deep frontal section 11 defining the periphery of the frame, reaching nearly to the floor, and a platform at the level of line 12—12. At the pivot axis 13 transversely thru the front end of the frame (which is at the right in Figure 2) and just inside the frame plates, as shown in Figure 3, there are journalled the front ground wheels 15R and 15L. These are set wide apart and each is journalled upon a stub shaft (as at 16R) which is mounted on the inside of the frame, as by means of a ring of cap-screws 17R, Figure 1. Each wheel has a pneumatic tire and a sprocket 18R and 18L, as shown in Figures 5 and 6, on which the roller drive chains 19R and 19L run up to the drive sprockets 20R and 20L on the drive shaft 21 which has a differential 22 and a ring gear 23 thereon.

Ring gear 23 is driven by a pinion gear 24 on shaft 25, the latter being provided with a brake drum 26 at one end, on which a brake band 27 is adapted to operate, and with a V-belt pulley 28 at the other end. The gears 23 and 24 and differential gearing 22 are contained within housing 30, and therefore permit adequate lubrication.

Engine E is provided with a V-belt drive pulley 31, Figure 6, which thru V-belt 32 drives pulley 33 on shaft 34, suction blower 35 having an outlet 36 delivering to bag 37 and an inlet 38 which connects to a reduced-pressure (slightly negative pressure) enclosure 39 located across the midsection of the machine.

The enclosure 39 is generally rectangular and is provided with solid walls but has a flexible (rubber or felt) flap 40 around its lower edge, forming a skirt which reaches almost to floor level. In the front wall 40 there is provided a rectangular opening 41 which is edged with flaps of rubber or felt at its sides 42 and with a flap of felt or rubber along its top boundary 43. Into this opening 41, the rear open end of pan P of rectilinear plan is adapted to be entered, with the rear lower edge 44 at a slight clearance above the floor.

The enclosure 39 is not intended to be entirely tight but is reasonably enclosed, and blower 35 is not designed to lift dirt by the vacuum method, but only to establish a negative pressure within the enclosure. The inrush of air at floor level under the skirt 40 and around the flaps 42 and 43 where they engage the pan P and under the lip 44 of the pan will be sufficient to restrain outward movement of dust that is stirred up by the rotary brush 70. The brush does the cleaning and sweeps dirt into the open end of pan P, but the slight negative pressure induced within the brush enclosure 39 has the effect of confining dust thereto.

Referring again to engine E, at its right end there is provided pulley 52 which is connected by a V-belt pulley on shaft 56 leading into gear-shift box 57 having a controller 58 and an output shaft 59 and pulley 60 which is connected by V-belt 61 to the pulley 28. This power transmission system serves to drive the front vehicle wheels 15R and 15L in the directions shown by the arrows for forward vehicle motion. It will be noted that the engine E has counterclockwise rotation as viewed in Figure 5 when gearbox 57 is in the "F" position shafts 56 and 59 are directly connected and the rotation is accordingly the same up to shaft 25 of gearbox 30. But pinions 24 and ring gear 23 reverse the rotation to clockwise at shaft 21, which is appropriate for driving wheels 15R and 15L in the proper direction for forward motion. The control lever 58, on gearbox 57, has three positions—F for forward motion; N for neutral or no motion; and R for reverse motion. A clutch (not illustrated) is incorporated into the gearbox 57 and is manipulated by a leverage 62 on the gearbox 57 connected by cable 62A which extends around pulley 62B to lever 62C on cross-shaft 62D operated by clutch pedal 62E, as illustrated, from a foot pedal. This is in accordance with conventional automotive practice. Brake band 27 is connected to the clutch control 62 so that when the clutch is engaged the brake 27 will be released and vice versa.

Adjacent pulley 52 on the shaft of engine E is a second, somewhat smaller pulley 64 connected by V-belt 65 to countershaft pulley 66 which is keyed to pulley 67. Both pulleys 66 and 67 run on stub shaft 68. A V-belt 69 connects pulleys 67 and 71, the later being on the brush shaft 72 which rotates the cylindrical brush 70. The rotation of brush 70 is in the desired counterclockwise rotation for brushing dirt and debris into the pan P. Brush rotation is in the direction shown regardless of whether the vehicle moves forward or backward (as determined by manipulation of lever 58).

Adjacent to pulleys 52 and 64 on the engine shaft is a third (smallest diameter) pulley 89, which is connected by a V-belt 73 to pulley 74 keyed to countershaft 76 journalled in the machine frame. Also keyed to shaft 76 is a pulley 75 which is connected by belt 77 to pulley 78 on shaft 79 of the gearbox 80, containing angle gears 81 which drive (normally vertical) shaft 82 which extends down, and at its lower end, carries the brush 84 having downwardly and outwardly extending long bristles 85. The gearbox 80 is pivoted on axis 86 on the machine frame, so that it and brush 84 can be swung from the normal position shown in full lines in Figure 4, to the dotted line position of Figure 4 (which is the same as the Figure 7 position), so as to permit pan P to be pulled forward for dumping. The rotation of pulleys 72, 74, 75, 78 and shaft 79, thru angle gears 81, produces a counterclockwise rotation of the front brush 84 as viewed in Figure 6. This is a distinct advantage for, as shown in Figure 4, the sweeping with FBW of the front brush 84 is added to the sweeping width CBW of the brush 70 to provide a total sweeping width TSW. The bristles 85 of brush 84 project outwardly to a greater diameter than the hub of brush 84 and thus sweep closely against curbs or walls, along the right side of the machine as driven. The axis of rotation of brush 84 is not quite vertical, but has a front tilt from the vertical, as shown in Figure 11, and a side tilt angle ST from the vertical, as shown in Figure 4. The result is that as the brush 84 rotates, the material against a wall or curb will be swept toward the centerline of the machine, where it is later swept up by brush 70.

The frame 10 of the machine is hence propelled (backwards or forwards) by the wheels 15R and 15L at the front of the machine, with the pan P held between them. The mounting of pan P is illustrated in Figures 1, 2, 7 and 9. The frame 10 has a wide open-bottomed mouth defined by edges 10A–10G. Inside the frame and fastened to it are a pair of downwardly and rearwardly slanted parallel rails, of which one of the rails 90 appears in Figure 7 and the other rail 91 appears in Figure 9. These rails are angles, with the bottom flanges 90A and 91A turned towards each other. The rectilinear pan P is shaped in side elevation as shown in Figure 9, and has a front wall P1, a bottom P2 which slants downwardly and rearwardly and terminates in a more sharply down-slanted lip P3 which can be of metal or rubber. This lip P3 ordinarily clears the floor by ⅛–¼ inch. The front of the pan has an inturned hook P4 at each end, extending outwardly from the sidewalls of the pan far enough to engage over the edges 10B and 10F of the mouth. There is ordinarily a little clearance between the edges 10B and 10F and the undersurface P5 of the hook. Then on the sidewall of the pan there are provided outwardly extending lugs P6 which rest on the flanges 90A and 91A of the slanted rails. At the back of the pan at each side is a hangar 92 with a wheel 94 on it, positioned to roll on the flange 90A (or 91A).

The clearance "C" under hte front of the pan permits the pan to ride up and over an obstruction, such as a hump or stone, and the rear end of the pan will be elevated from the normal position shown in solid lines in Figure 9, to the dotted line position shown in the same figure. This will temporarily increase the clearance between the lip P3 and the floor level as the pan rides over the obstruction, and once over, the pan drops back down to normal (full line) position. This pivoting action of the pan takes place about the lugs 96 as a center and in so doing the felt seal 43 is merely flexed up. The pan P has a top along the line P7, on the rear edge of which the felt seal 43 resiliently rests. A handle P8 is provided at the front, and to dump the pan, it is lifted by the handle P8 until hooks P4 clear edges 10B–10F, whereupon the pan can be pulled forward, the wheels 94 rolling on rail flanges 90A–91A until the pan is drawn free. Of course, when pulling the pan out to dump it, the brush 84 is adjusted to the non-interfering position shown in Figure 7 and in dotted lines in Figure 4.

The machine frame 10 is provided with one rear wheel 95 which is mounted in a fork 96 pivoted on the vertical shaft 97. A steering wheel 98 is connected by suitable gearing 98A and linkages 98B to operating arm 98C on pivot fork 96 for steering (as shown in dotted lines in Figure 6). The short wheelbase and wide steering angle combine to give exceptional maneuverability for close quarter control. When wheel 95 is set straight along the longitudinal axis of the machine, as shown in Figure 3, the whole machine will move straight forward (or backward) along the longitudinal axis LA of the machine.

Mounting of the brush 70 is by means of radius rods 100, one on each side of the machine. The radius rods are welded to a stout tube 101, Figure 2, which is journalled for rotation in the frame. This tube in turn is provided with journals to receive a shaft on which pulleys 66—67 (which are keyed together) rotate. The free, forwardly extending ends of the radius rods 100 (one at each side of the machine) support stub shafts 72 on which pulley 71 rotates and the pulley 71 is connected by any suitable key or connection to brush 70 to rotate it.

On the machine frame there is provided a lever and cable linkage for raising and lowering the radius rods 100 (and hence brush 70). The heavy side plate 105, Figure 10, which is a part of the frame 10, is rolled over to form a top surface 106, which is provided with side-by-side elongated slots 107–108 (see Figure 12). In one slot where works a lever 109 pivoted at 110 and having its lower end connected by clevis 111, cable 112, which runs over pulley 113 and connects via clevis 114 to a pin on one of the radius rods 100 at one side of the machine. When in the full line position shown in Figure 10, lever 109 has elevated the radius rod 100, which is fastened solidly thru tube 101 to the radius rod at the opposite side of the machine. Hence brush 70 is lifted. The upper end of lever 109 is provided with a slidable round rod 115 having a flanged collar 116 thereon that is normally pushed up by spring 117 until the shank of the collar enters thru hole 108A in the slot. The collar flange 116A limits upward movement. The collar is too big to enter the slot 108 and hence lever 109 will be retained in the position shown until the rod is pushed down, so as to lower the collar 116 to below the top 106 and then rod 115 will move forward to lower brush. A bolt and washer assembly 120 may be placed at any desired position to limit downward movement of the brush 70.

The mode of elevating brush 84 is similar. In the case of brush 84, a pivot 142 is provided at a low forward position along the right side of the frame and arm 121 is pivoted on it. Arm 121 is accurately slotted at 122 and a steadying bolt is provided at 123 but this bolt does not prevent up and down swinging movement of arm 121. The front end of arm 121 is bent around to form a flange 125 on which the gearbox 80 is pivoted on axis 86 (see Figures 5 and 6), and an ear 126 is provided on its rear face to which clevis 128 is attached. Cable 129 extends upwardly thru a window in frame portion 105 and is connected by clevis 130 to lever 131, which is welded to lever 132. Lever 132 pivots on pin 110 alongside lever 109. Lever 132 has a round rod 133 which is movable axially in respect to lever 132 and is normally spring pressed upwardly by spring 135 which bears against collar 134. When pushed down (axially) rod 133 enters slot 107 and, as shown in full lines in Figure 11, permits brush 84 to be lowered to a position fixed by stop 136. When it is desired to elevate brush 84, lever 133-132 is pushed back until collar 134 enters hole 107A (see Figure 12).

The front and flange 125 of lever arm 121 has several notches in its upper edge and gearbox 80 has an extension 138 on it thru which a detent rod 139 moves up and down to engage one notch, to hold the brush 84 in the full line position of Figures 1, 3, 4 and 8. When it is desired to withdraw pan P for emptying, the rod 139 is pulled up against resistance of spring 140 and the gearbox 80 (and hence brush 84) can be rotated to swing the brush to the dotted line position of Figure 4 (and as shown in Figure 7), so as not to interfere with withdrawal of pan P. The guard 77A for belt 77 and guard 84A for brush 84 are attached to the gearbox 80 and its extension 138 and move with the brush 84 and gearbox 80 when they are tilted. This is illustrated in Figures 7 and 8.

It will be noted that shaft 76 is displaced upwardly in respect to pivot 120 of arm 121 (see Figure 11). Hence when arm 121 is elevated to raise brush 84, belt 77 is slackened and rotation of brush 84 is stopped.

A comfortable operator seat 180 is provided and under it and above frame 10 is a guard 181 which serves as a shield for the dust bag 37. An access door is provided at 183 (Figure 1), so as to permit servicing the brush 70.

The brush 70 may be constructed using separate sticks or frames for the mounting of the bristles, according to conventional practice, but according to the present invention it is preferable to construct the brush 70 according to the method set forth in Figures 13, 14 and 15, or according to Figures 16 and 17.

As many apparently widely different embodiments of this invention may be made without departing from the spirit and scope thereof, it is understood that we do not limit ourselves to the specific embodiments thereof.

What we claim is:

1. A riding type short wheelbase sweeping machine comprising a frame composed of an elevated deck, an operator seat attached centrally thereon and at an elevation such that the operator's feet rest on the deck when the operator is in said seat, the plan and dimensions of said deck being such as to provide a forward projection beyond the seat sufficient to accommodate the forward projection of the operator's feet and narrow side areas alongside said seat and a short rear projection behind the seat, said frame also including downwardly depending integrally attached side-skirts along the sides of the deck and a downwardly depending transverse skirt attached to the deck and to the side skirts, said transverse skirt and side skirts forming respectively the back-wall and sidewalls of a sweeping enclosure located below the operator seat position, steerable rear wheel means attached to the underside of the rear projection of the frame deck and at substantially the longitudinal centerline thereof, front wheels attached to the forward ends of the side-skirts, a cylindrical brush mounted on the frame in said sweeping space and for rotation on a horizontal axis under the operator seat position and ahead of said transverse skirt, a refuse container removably mounted between the side skirts and with its rear end ahead of the rotary brush, said container being of a width substantially equal to the sweeping width of the rotary brush, said container being closed except for its rear end, flexible seal means between the refuse container and the adjacent inner surfaces of the side skirts and the underside of the deck, motor means mounted upon the deck below the operator seat, vacuum blower means connected to the motor said vacuum blower having an inlet and an outlet, said inlet being connected to the sweeping space in which the rotary brush is located, power transmission means connecting the motor and the wheels for propelling them and connecting the motor and brush for driving the brush, operator controls for the transmission means and for the steerable rear wheel positioned adjacent the operator seat, and a dust collecting bag mounted above the deck and connected to the outlet of the vacuum blower means.

2. A sweeping machine comprising a frame having a longitudinal axis of normal movement, a cylindrical brush mounted on said frame for rotation about a horizontal axis transverse to said longitudinal axis, a refuse pan having an opening at the rear thereof mounted on the frame ahead of the cylindrical brush for receiving the sweepings therefrom, said pan being substantially the same width as the sweeping width of the cylindrical brush, said pan being mounted for forward withdrawal movement in the direction of the longitudinal axis, a curb brush, curb brush mounting means on the frame mounting the curb brush for rotation about a substantially vertical axis ahead of the pan, said curb brush being of a diameter and normally positioned for sweeping a path overlapping the path swept by the horizontal brush, said curb brush in such position obstructing forward withdrawal of the pan, said curb brush mounting means being constructed for movement of said curb brush to a position such that it does not obstruct forward withdrawal movement of the pan.

3. The sweeping machine of claim 2 further characterized in that transmission means is provided for rotating the cylindrical brush and curb brush, and means on the frame is provided and connected to the curb brush mounting means and transmission means for simultaneously elevating the curb brush to non-sweeping position and disconnecting the transmission means for driving it.

References Cited in the file of this patent

UNITED STATES PATENTS

| Re. 20,453 | Furstnow | July 20, 1937 |
| 1,553,234 | Hansen | Sept. 8, 1925 |
| 1,687,728 | Liddell | Oct. 16, 1928 |
| 1,718,151 | Jemmison | June 18, 1929 |
| 2,104,837 | Hunt | Jan. 11, 1938 |
| 2,190,206 | Churchill | Feb. 13, 1940 |
| 2,283,229 | Richards | May 19, 1942 |
| 2,286,245 | Wilson et al. | June 16, 1942 |
| 2,300,280 | Teager | Oct. 27, 1942 |
| 2,324,272 | Anderson | July 13, 1943 |
| 2,327,879 | Farrar | Aug. 24, 1943 |
| 2,655,678 | Keogh | Oct. 20, 1953 |
| 2,701,377 | Luksch et al. | Feb. 8, 1955 |
| 2,708,280 | Antos et al. | May 17, 1955 |

UNITED STATES PATENT OFFICE

CERTIFICATION OF CORRECTION

Patent No. 2,972,159                  February 21, 1961

Albert S. Swanson et al.

It is hereby certified that error appears in the above numbered patent requiring correction and that the said Letters Patent should read as corrected below.

Column 3, line 43, for "with" read -- width --; column 4, line 7, for "hte" read -- the --; line 54, for "where" read -- there --; column 5, line 21, for "and" read -- end --; column 6, line 16, after "motor" insert a comma.

Signed and sealed this 8th day of August 1961.

(SEAL)
Attest:

ERNEST W. SWIDER                          DAVID L. LADD
Attesting Officer                            Commissioner of Patents